INVENTOR.
WAYNE K. DAVIS
BY Bruce & Brosler
HIS ATTORNEYS 3,068,087
METHOD AND MEANS FOR THE APPLICATION OF CHEMICALS TO TREES AND OTHER WOODY PLANTS
Wayne K. Davis, 5611 Buena Vista Ave., Oakland, Calif.
Filed July 19, 1957, Ser. No. 672,901
4 Claims. (Cl. 71—2.1)

My invention relates to the treatment of trees and other plant life, and more particularly to such treatment as involves the application of chemicals thereto, regardless of the nature of the chemical or the reason for its application.

Trees and other woody plants have been previously treated for one purpose or another through the application of chemicals thereto, as by spraying, dusting, or fumigation of the foliage; by the introduction of such chemicals into the plant tissues by injection or girdling; by painting or spraying of the bark; and by fumigating or treating the roots or the adjacent soil.

Depending on the results desired, many types of chemicals known as phytocides, insecticides, bactericides, fungicides, etc., have been employed, with attention in recent years being directed, in a large measure to the use of plant hormones, such as 2, 4–D and 2, 4, 5–T, plant stimulants, and other plant translocatable materials.

Whatever the treatment desired, or the chemicals employed, one of the difficulties encountered was that of introducing sufficient quantity into the plant in one simple operation to accomplish the desired results. Attempts to inject materials into the trunks or stems of woody plants or those with thick bark have presented special problems, often leading to premature damaging or other modification of the living tissue, which usually is undesirable, particularly in the application of pesticides and plant stimulators, as it interferes with translocation of material within the plant.

The application of chemicals by injection as well as by such methods as spraying, painting, dusting or the like, involve an excessive amount of labor, while the dusting and spraying procedure have the added disadvantages of wastage of material and creation of a hazard to surrounding plants and property.

Among the objects of my invention are:

(1) To provide a novel and improved method of applying chemicals in the treatment of trees or other plant life;

(2) To provide a novel and improved method of applying chemicals to trees and other plant life in amounts sufficient to fulfill requirements, in one simple application;

(3) To provide a novel and improved method of applying a pesticide, phytocide, or other chemicals to trees or other plant life;

(4) To provide a novel and improved technic for application of chemicals to trees or other plant life for use in the treatment thereof.

Additional objects of my invention will be brought out in the following description of the same, taken in conjunction with the accompanying drawings wherein.

Figure 1:
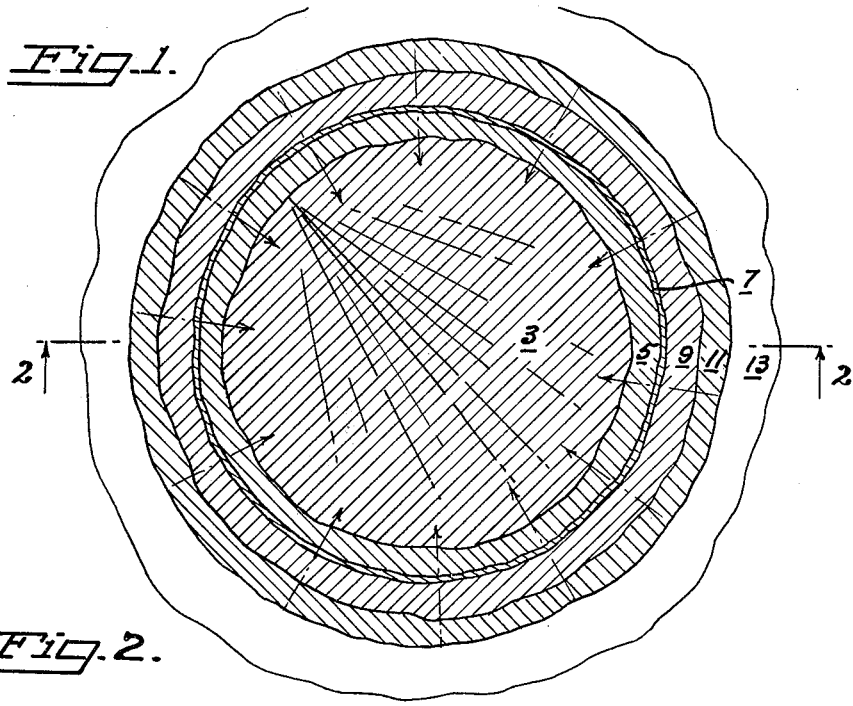
FIG. 1 is a view representative of a section taken through a tree trunk.
Figure 2:
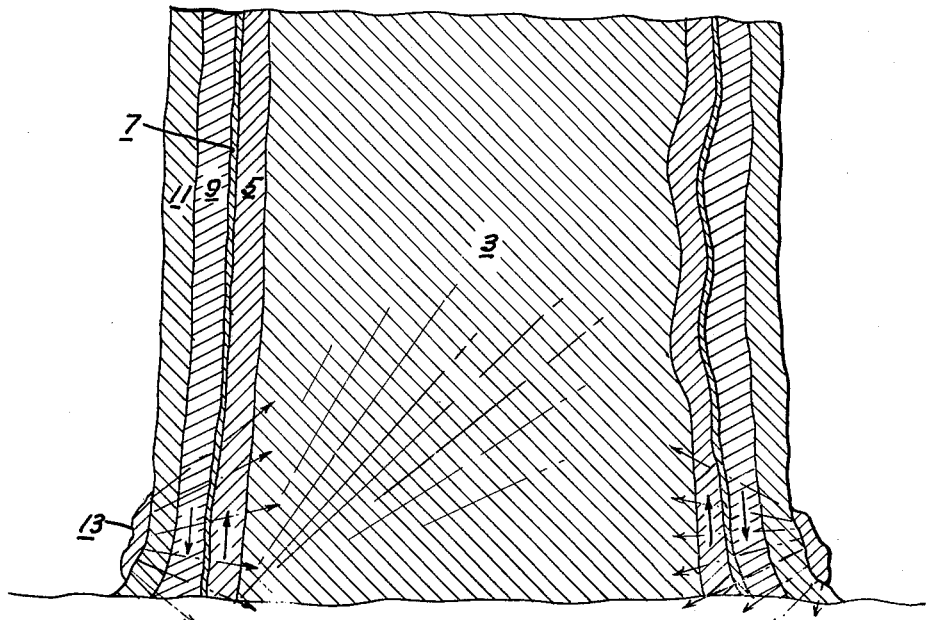
FIG. 2 is a view in section taken in the plane 2—2 of FIG. 1.

A better understanding of the problems and the manner in which such problems have been solved by the present invention may be had by a preliminary understanding of the internal structure of a tree or other woody plant. Referring to the drawings in this connection, the central and by far the greater portion 3 of a tree is made up of heart wood, which merges into and is surrounded by a substantial layer of sap wood 5 whose general function is to convey to the leaves, such minerals and other nutritives as are absorbed by the roots of the tree. This is the chief route that such chemicals must take to reach the upper part of the plant. In the leaves, the material carried up from the roots is converted into starch and sugar.

Surrounding the sap wood is the cambium, which is a very thin layer 7 of plant cells that functions chiefly to increase the size of the plant. The adjacent layer 9 surrounding the cambium is comprised of the inner bark and phloem, which is composed mostly of living cells that function to conduct the starch and sugar etc. from the leaves down to the roots of the tree. The inner bark merges into the outer surrounding bark 11 which is made up mostly of dead cells and serves as a protective covering for the tree.

Effective treatment of a tree, particularly if it is desired to destroy the same, can best be realized by introducing the chemical into those layers of the tree, namely the sap wood 5 and inner bark 9 wherein circulation occurs and the treatment chemicals will readily be distributed throughout the sensitive and responsive portions of the growing plant. To reach these vital layers, requires deep penetration into the trunk or stem, and to assure the proper amount of such chemical which will suffice to accomplish the desired result, will necessitate the repeated application of the chemical to the surface of the outer bark, if the chemical is to be applied by painting, or spraying, since only a small amount may be applied at any one time by such methods. In some cases, because of this, effective destruction of some trees cannot successfully be accomplished.

In accordance with the present invention, the chemicals to be employed in the treatment of a tree, or the like, are bound up in an emulsion of sufficient stiffness to be self-sustaining when applied as a coating 13 up to a half inch or more in thickness and such emulsion is applied to the bark of the tree with a spatula or by spray gun, and preferably by encircling the tree with a band of the material. Thereafter, through a slow process of breakdown, the active ingredients are slowly released and gradually absorbed into the tree trunk and to a depth of penetration sufficient to enter the circulatory system of the tree. Any desired number of active ingredients can be incorporated into the one emulsion and sufficient can be applied at one time by this method to accomplish the desired end.

The emulsion may be either an oil-in-water emulsion, with the active ingredients primarily in the oil phase, or it may be a water-in-oil emulsion, with the active ingredients primarily in the water phase, or either type of emulsion may embody the active ingredients in either or both the water and oil phases.

When the emulsion is to be of the oil-in-water type, it may be prepared in accordance with the procedure outlined in my patent for Material and Method for Control of Wood Destroying Organisms, No. 2,708,640, of May 17, 1955, the active ingredients to be employed being substituted for those utilized in the emulsion of my aforementioned patent. In such emulsion, the oil phase comprises on the order of 80% or more of the total volume.

A water-in-oil emulsion for the purpose of my present invention, may be prepared as follows:

The oil phase includes

| | Parts |
|---|---|
| Kerosene or other oil | 50 |
| Petroleum jelly | 50 |
| Diethylene glycol | 3 |
| Propylene glycol | 6 |
| Oleic acid | 6 |
| Karaya gum | 2 |

The water phase involves,

| | Parts |
|---|---|
| Water | 500 |
| Disodium methylarsonatehexohydrate | 2 |

All parts listed in the above formula are by weight.

The oil and petroleum jelly are first heated and the other associated ingredients added and mixed to form the oil phase. The water phase components are mixed and then added slowly to the oil phase while it is being agitated. The quantity of the water phase may be varied somewhat, if so desired.

The stiffness of the emulsion is governed largely by the percentage of petroleum jelly and the vigor of the agitation. For certain purposes, animal oil and vegetable oil will be found desirable. In such instances these can be substituted for all or part of the mineral oil. Such substitution is also possible in the oil-in-water emulsions.

When the water-in-oil emulsion is utilized, it offers the added advantage that such type of emulsion is not readily removed by rain or sprinkling.

The quantities indicated in the foregoing formula for the water-in-oil emulsion are not critical, being controlled largely by the degree of stiffness desired in the emulsion as well as the stability thereof which latter characteristic is largely controllable by the karaya gum ingredient.

Through the variations made possible by this invention, an adequate reservoir of the treatment chemicals is provided whereby the active ingredients are released in such areas of the plant, and in such quantities, and over such a period of time as is required for effective treatment.

From the foregoing description of my invention, it will be apparent that the same fulfills all the objects thereof, and while I have disclosed the same in considerable detail, the invention is subject to alteration and modification without departing from the underlying principles involved. I accordingly do not desire to be limited in my protection to the specific details described except as may be necessitated by the appended claims.

I claim:

1. The method of chemically treating living plants, comprising incorporating a sap transportable chemical in an emulsion of sufficient stiffness to be self-sustaining as a coating of the order of a half inch in thickness and capable of breaking down and releasing such transportable chemical for absorption by such living plant, and applying to a desired portion of such plant, a self-sustaining quantity of said emulsion sufficient to cause penetration of the transportable chemical into the sap stream of the living plant, whereby the effect of such transportable chemical may reach other parts of such living plant.

2. The method of chemically treating living plants, comprising incorporating a sap transportable chemical in an emulsion of sufficient stiffness to be self-sustaining as a coating of the order of a half inch in thickness and capable of breaking down and releasing such transportable chemical for absorption by such living plant, and encircling a desired portion of such living plant with a thick self-sustaining layer of said emulsion, sufficient to cause penetration of the transportable chemical into the sap stream of the living plant, whereby the effect of said transportable chemical may reach other parts of such living plant.

3. The method of chemically treating living plants, comprising incorporating a sap transportable chemical in an oil-in-water emulsion of sufficient stiffness to be self-sustaining as a coating of the order of a half inch or more in thickness, said oil being a liquid oil and said emulsion being capable of breaking down and releasing such transportable chemical for absorption by such living plant, and applying to a desired portion of such living plant, a thick self-sustaining layer of said emulsion, sufficient to cause penetration of said transportable chemical into the inner bark of such living plant, whereby the effect of said transportable chemical may reach other parts of such living plant.

4. The method of chemically treating living plants, comprising incorporating a sap transportable chemical in a water-in-oil emulsion in which the oil carrier in the oil phase is a liquid oil, the said emulsion being of sufficient stiffness to be self-sustaining as a coating of the order of a half inch or more in thickness and capable of breaking down and releasing such transportable chemical for absorption by such living plant, and applying to a desired portion of such living plant, a thick self-sustaining layer of said emulsion, sufficient to cause penetration of said transportable chemical into the inner bark of such living plant, whereby the effect of said transportable chemical may reach other parts of such living plant.

References Cited in the file of this patent

UNITED STATES PATENTS

| 1,565,503 | Henderson et al. | Dec. 15, 1925 |
| 1,633,095 | Handy | June 21, 1927 |
| 1,785,641 | Melhus | Dec. 16, 1930 |
| 1,809,016 | Brogden et al. | June 9, 1931 |
| 2,012,975 | Schmittutz | Sept. 7, 1935 |
| 2,034,152 | Parrish | Mar. 17, 1936 |
| 2,057,413 | Bridgeman et al. | Oct. 13, 1936 |
| 2,182,081 | Hatfield | Dec. 5, 1939 |
| 2,206,520 | Tisdale | July 2, 1940 |
| 2,209,970 | Hay | Aug. 6, 1940 |
| 2,296,401 | Perkins | Sept. 22, 1942 |
| 2,447,475 | Kaberg et al. | Aug. 17, 1946 |
| 2,580,048 | Shmidl | Dec. 25, 1951 |
| 2,708,640 | Davis | May 17, 1955 |